(12) United States Patent
Chiou

(10) Patent No.: US 11,839,333 B2
(45) Date of Patent: Dec. 12, 2023

(54) BEAN GRINDING MACHINE WITH A QUICK DETACHABLE GRINDING BASE

(71) Applicant: Shih-Hsun Chiou, New Taipei (TW)

(72) Inventor: Shih-Hsun Chiou, New Taipei (TW)

( * ) Notice: Subject to any disclaimer, the term of this patent is extended or adjusted under 35 U.S.C. 154(b) by 0 days.

(21) Appl. No.: 17/725,571

(22) Filed: Apr. 21, 2022

(65) Prior Publication Data

US 2023/0337858 A1 Oct. 26, 2023

(51) Int. Cl.
*A47J 42/16* (2006.01)
*A47J 42/06* (2006.01)
*A47J 42/46* (2006.01)

(52) U.S. Cl.
CPC .............. *A47J 42/16* (2013.01); *A47J 42/06* (2013.01); *A47J 42/46* (2013.01)

(58) Field of Classification Search
CPC ............ A47J 42/06; A47J 42/40; A47J 42/46
See application file for complete search history.

(56) References Cited

U.S. PATENT DOCUMENTS

| 2015/0157167 A1* | 6/2015 | Eicher | A47J 42/10 99/286 |
| 2017/0112324 A1* | 4/2017 | Kaczmarek | A47J 42/06 |

FOREIGN PATENT DOCUMENTS

WO WO-2016042324 A2 * 3/2016 ............ A47J 42/08

* cited by examiner

*Primary Examiner* — Matthew Katcoff
*Assistant Examiner* — Mohammed S. Alawadi

(57) ABSTRACT

A bean grinding machine with a quick detachable grinding base comprises: a casing; a box body installed within the casing; an upper side the box body having an inlet for receiving external objects to be ground; a lower side of the box body having a lower opening; a grinding disk installed within the box body and between inlet and the lower opening of the box body; the grinding disk being a circular structure with a hollow center portion; an installing unit installed at a lower opening of the box body; and a grinding base installed with a grinding head; the grinding head being positioned within the grinding disk; the grinding base and the grinding head do not rotate; and a gap being formed between grinding teeth of the grinding head and grinding teeth of the grinding disk; and an upper side of the gap is connected to the inlet.

10 Claims, 13 Drawing Sheets

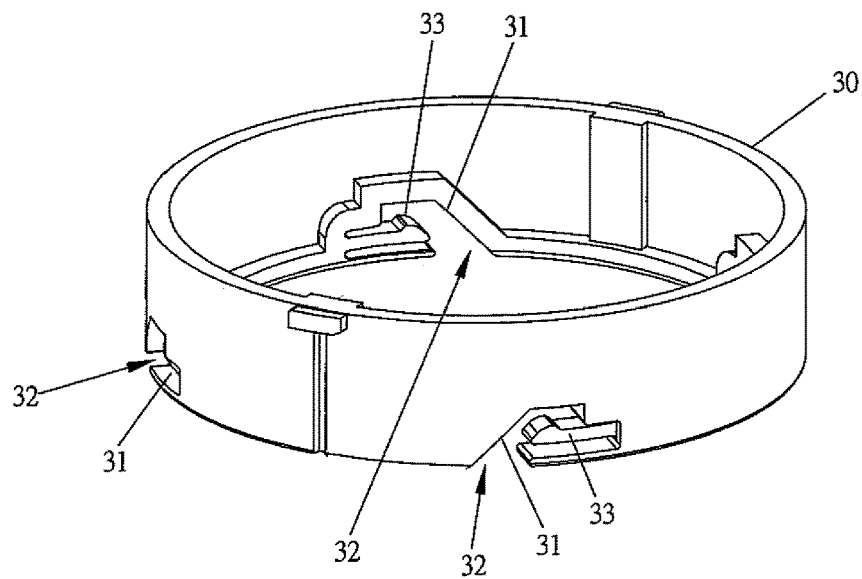
FIG. 8
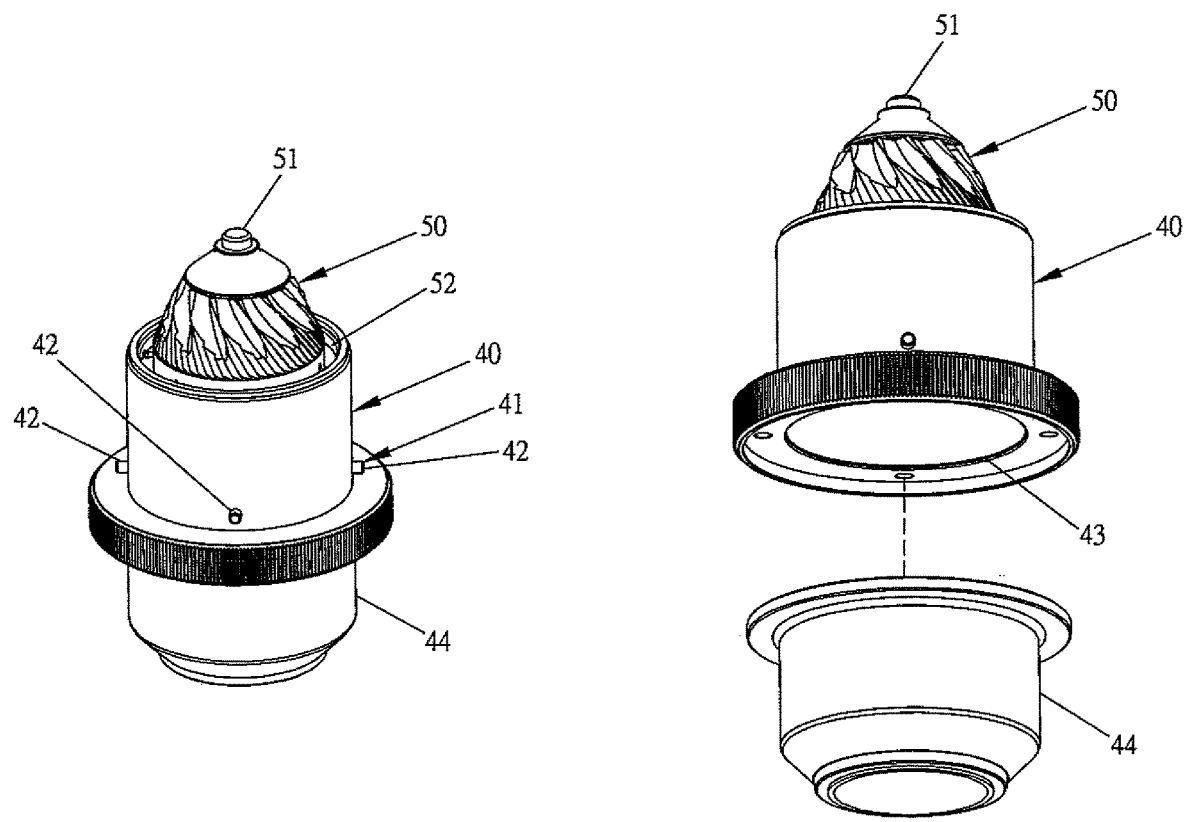
FIG. 9
FIG. 10

BEAN GRINDING MACHINE WITH A QUICK DETACHABLE GRINDING BASE

FIELD OF THE INVENTION

The present invention is related to bean grinding machines, and in particular to a bean grinding machine with a quick detachable grinding base.

BACKGROUND OF THE INVENTION

The prior art bean grinding machine (such as coffee bean grinding machine) serves to grind the beans into particles. The grinding machine thereof mainly includes a grinding disk and a grinding head within the grinding disk. The grinding head is driven by a driving device to rotate, while the grinding disk is un-rotatable. The objects to be ground fall into the gap between the grinding disk and the grinding head. When the grinding head is driven to rotate, the grinding teeth within the grinding disk and the grinding teeth at an outer side of the grinding head will rotate with respect to each other so as to grind the objects into particles.

However, the prior art grinding mechanism has a very sophisticated structure. In that the grinding head installed within the mechanism needs to be precisely vertically aligned with the grinding disk so as to achieve the objective of uniformly grinding. This prior art grinding mechanism is very complicated and need a longer time for calibration of the alignment. If the grinding machine is needed to be cleaned, it is very difficult to detach the grinding head from the structure, as a result, a very long time is necessary for detaching. This is inconvenient and time consumed. Furthermore this complicated structure also increases the overall cost in production.

Therefore, there is an eager demand for a novel grinding machine which has an easily detachable grinding head so as to resolve the defects in the prior art grinding machine.

SUMMARY OF THE INVENTION

Accordingly, the object of the present invention is to provide a bean grinding machine with a quick detachable grinding base, wherein the grinding head is detachable from the box body of the grinding disk so that a user can detach the whole grinding head rapidly. It can be cleaned rapidly and another grinding head can be updated. The rapid detachable structure of the present invention has a simple structure with a lower producing cost. Furthermore in the present invention, only the grinding disk is rotatable, while the grinding head does not rotate. The motor and the speed reduction unit are used to drive the grinding disk so as to have greater torque. Two bearings are used to steady the grinding disk as it rotates. As a result, the center of the grinding head and the grinding disk is retained with a precise vertical positioning so that the objects can be ground uniformly.

To achieve above object, the present invention provides a bean grinding machine with a quick detachable grinding base, comprising: a casing; a box body installed within the casing; an upper side the box body having an inlet for receiving external objects to be ground; a lower side of the box body having a lower opening; a grinding disk installed within the box body and between inlet and the lower opening of the box body; the grinding disk being a circular structure with a hollow center portion; an installing unit installed at a lower opening of the box body; and a grinding base installed with a grinding head at an upper end thereof; the grinding head being positioned within the grinding disk; the grinding base being installed with at least one linking unit for linking the installing unit; the at least one linking unit being separably attached to the box body; the grinding base and the grinding head do not rotate; an outer side of the grinding head and an inner side of the grinding disk being installed with grinding teeth; a gap being formed between the grinding teeth of the grinding head and the grinding teeth of the grinding disk; and an upper side of the gap is connected to the inlet.

BRIEF DESCRIPTION OF THE DRAWINGS

FIG. 8 is a schematic view showing the installing unit of the present invention.

FIG. 9 is an assembly schematic view of the grinding base, grinding head and cover of the present invention.

FIG. 10 is an exploded schematic view of the installing unit and cover of the present invention.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Referring to FIGS. 1 to 15, the bean grinding machine with a quick detaching grinding base is illustrated. The present invention includes the following elements.

A casing 1 serves for containing other elements of the present invention.

Figure 1:
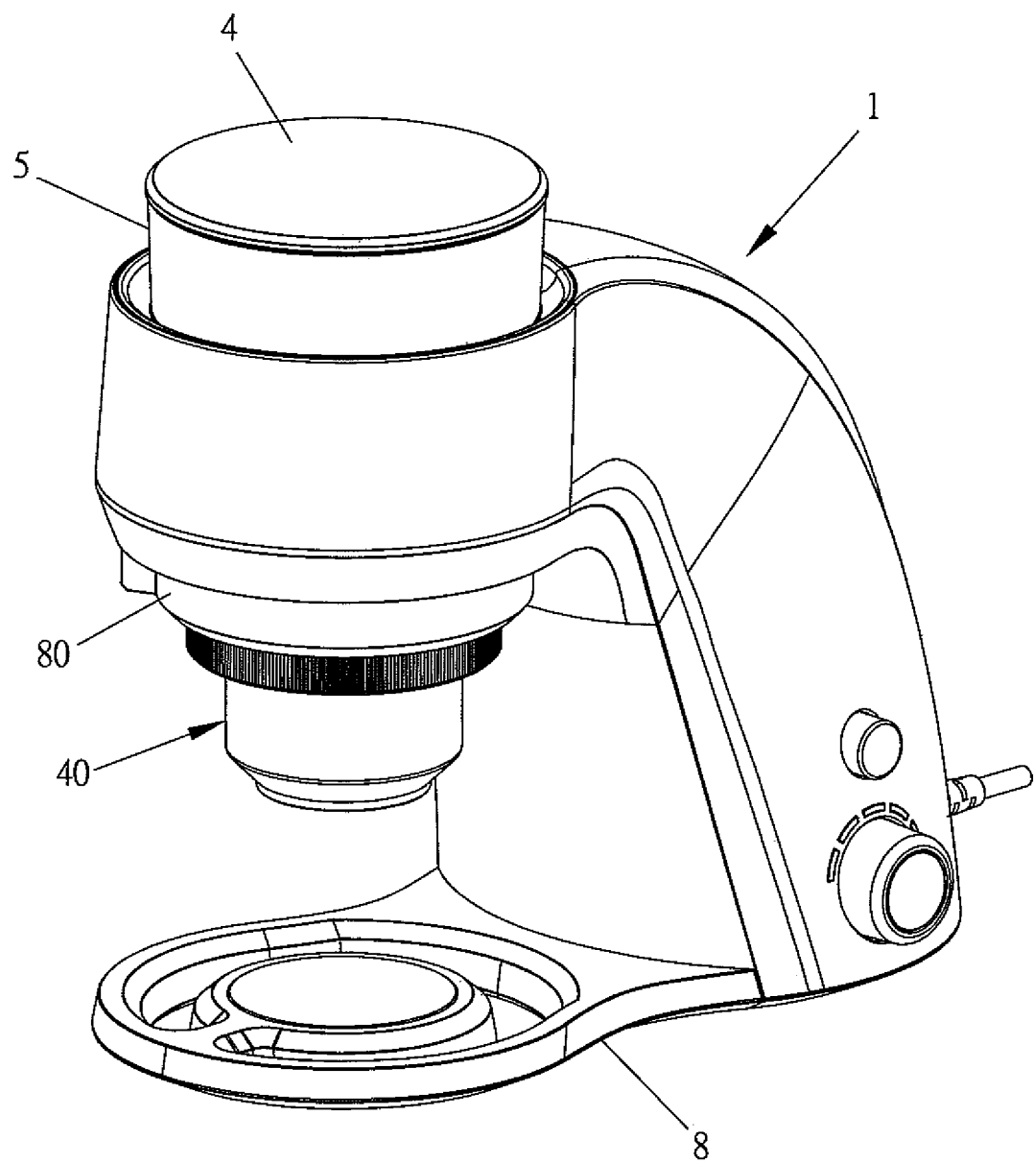
FIG. 1 is an assembly schematic view of the elements of the present invention.
Figure 2:
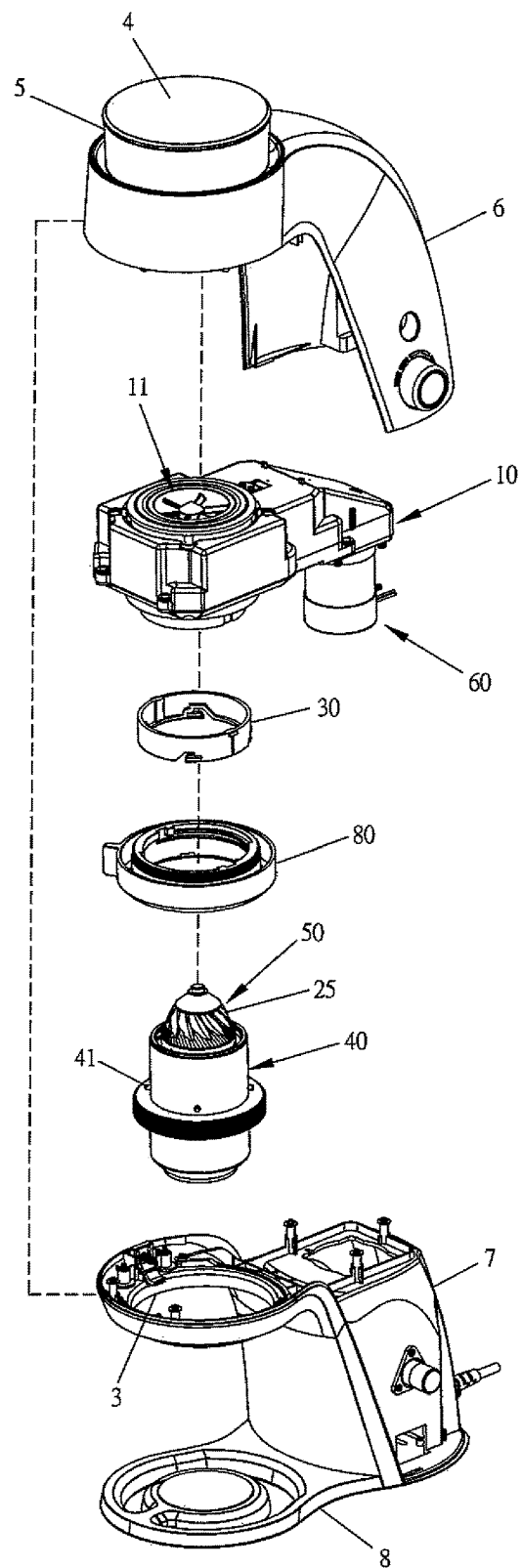
FIG. 2 is an exploded schematic view showing the elements of the present invention.

A box body 10 is installed within the casing 1, as illustrated in FIG. 2. An upper side the box body 10 has an inlet 11 for receiving external objects to be ground, such as coffee beans. A lower side of the box body 10 is a lower opening 12.

Figure 5:
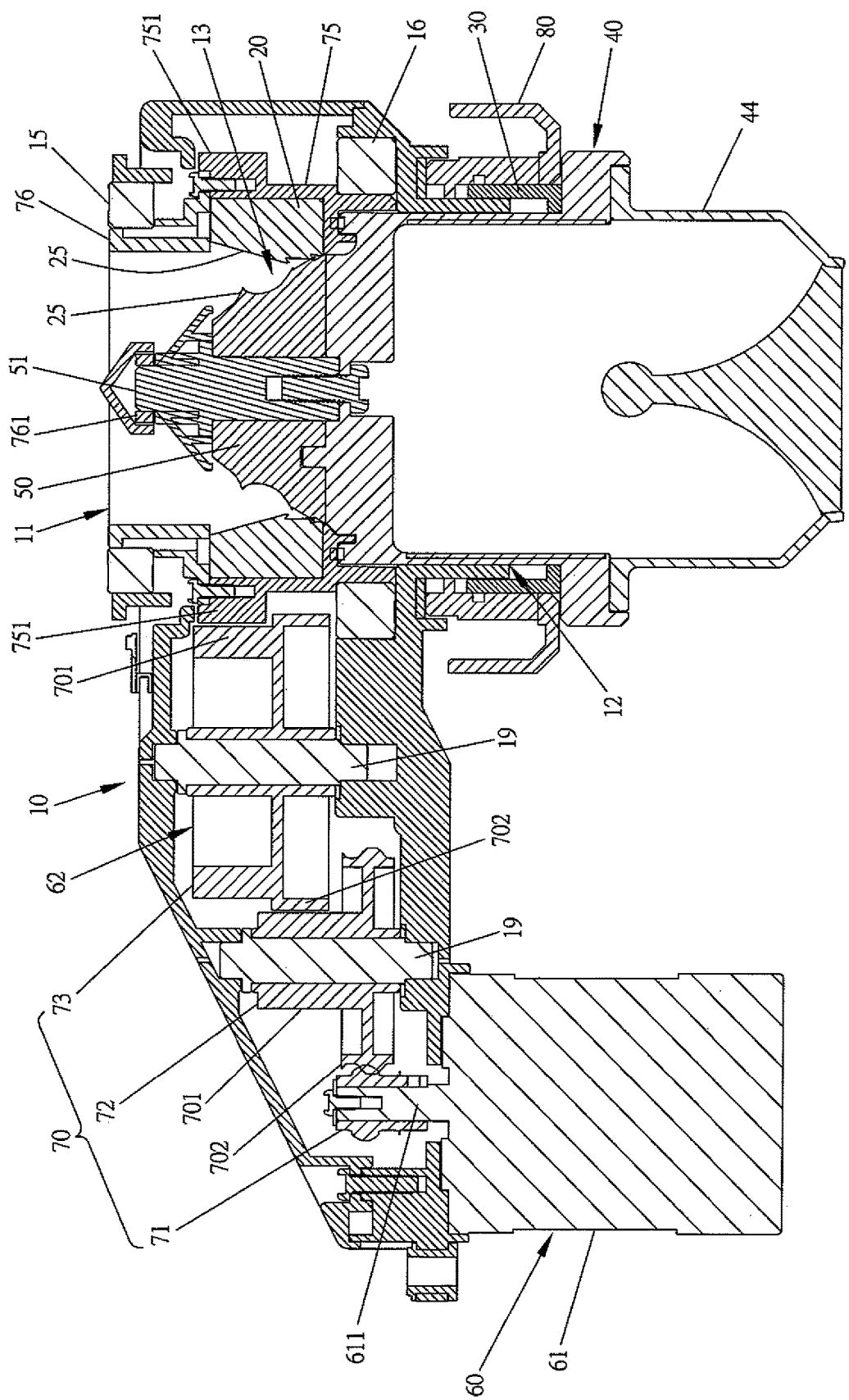
FIG. 5 is a cross section schematic view of FIG. 3.

A grinding disk 20 is installed within the box body 10 and is between inlet 11 and the lower opening 12 of the box body 10, as shown in FIG. 5. The grinding disk 20 is a circular structure with a hollow center portion.

Figure 4:
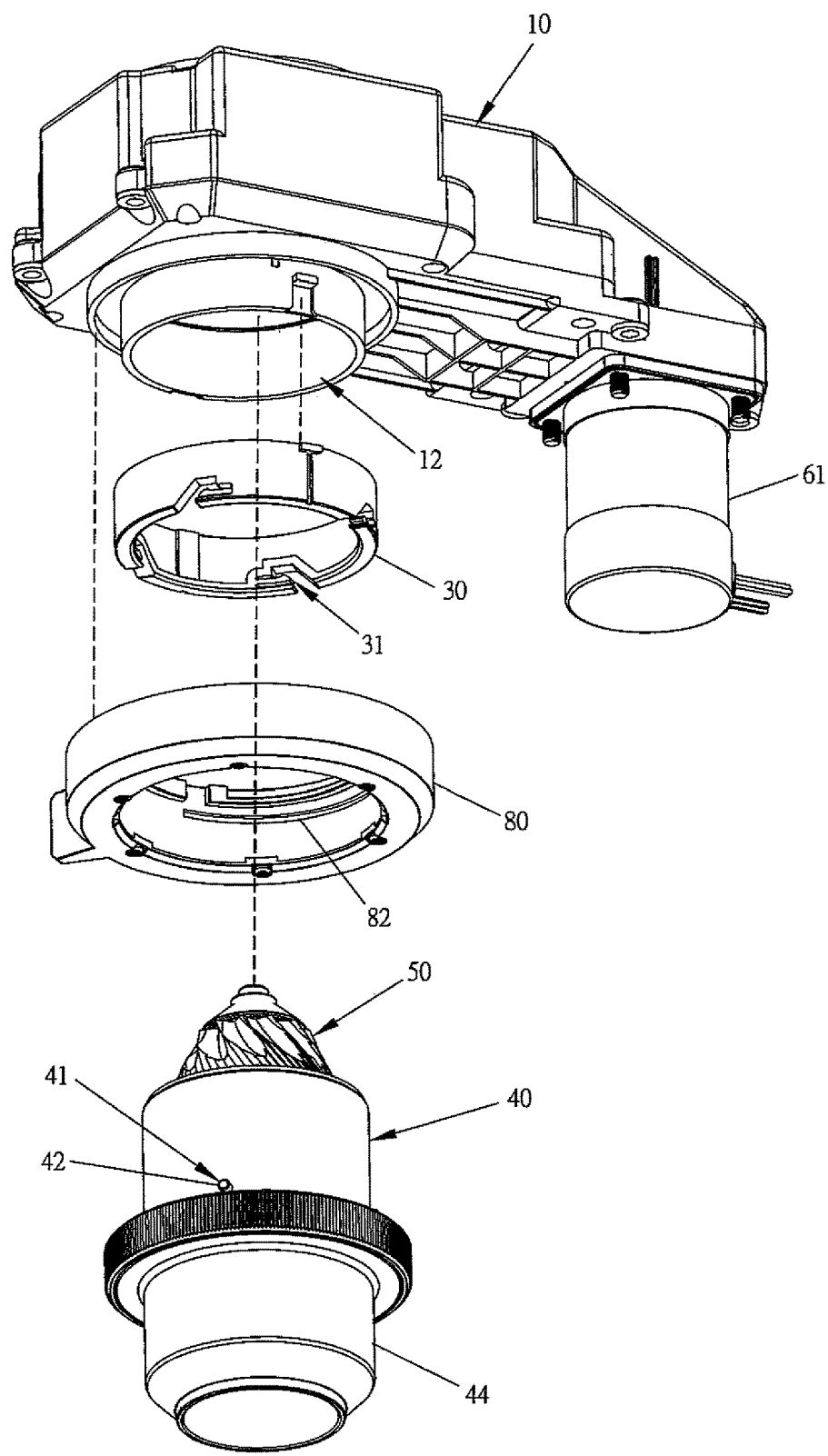
FIG. 4 is an exploded schematic view showing the box body, installing unit, adjusting ring and grinding base of the present invention.
Figure 7:
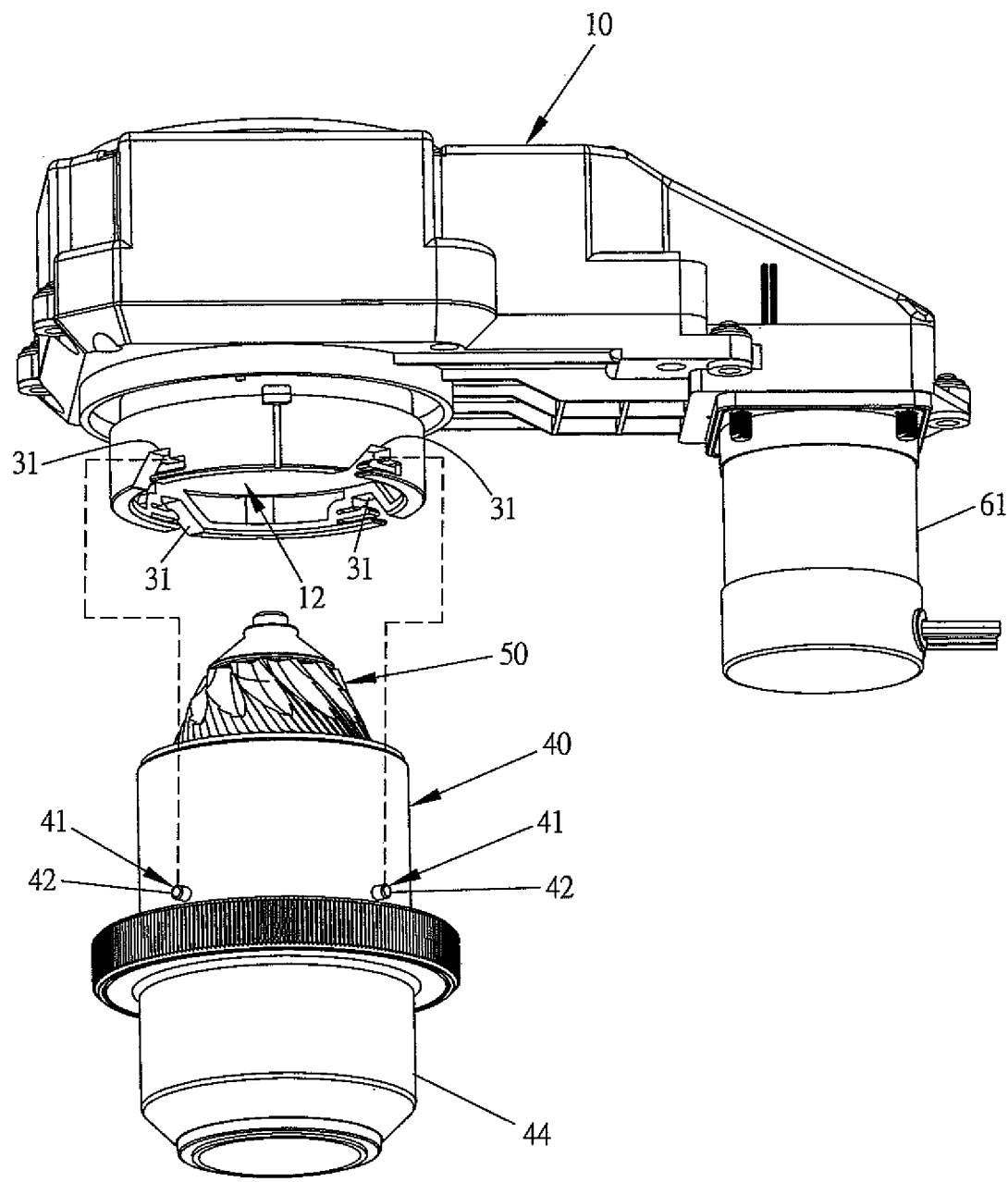
FIG. 7 is an exploded schematic view showing the installing unit and grinding base of the present invention.

An installing unit 30 is installed at a lower opening 12 of the box body 10, as illustrated in FIGS. 4 and 7.

Figure 6:
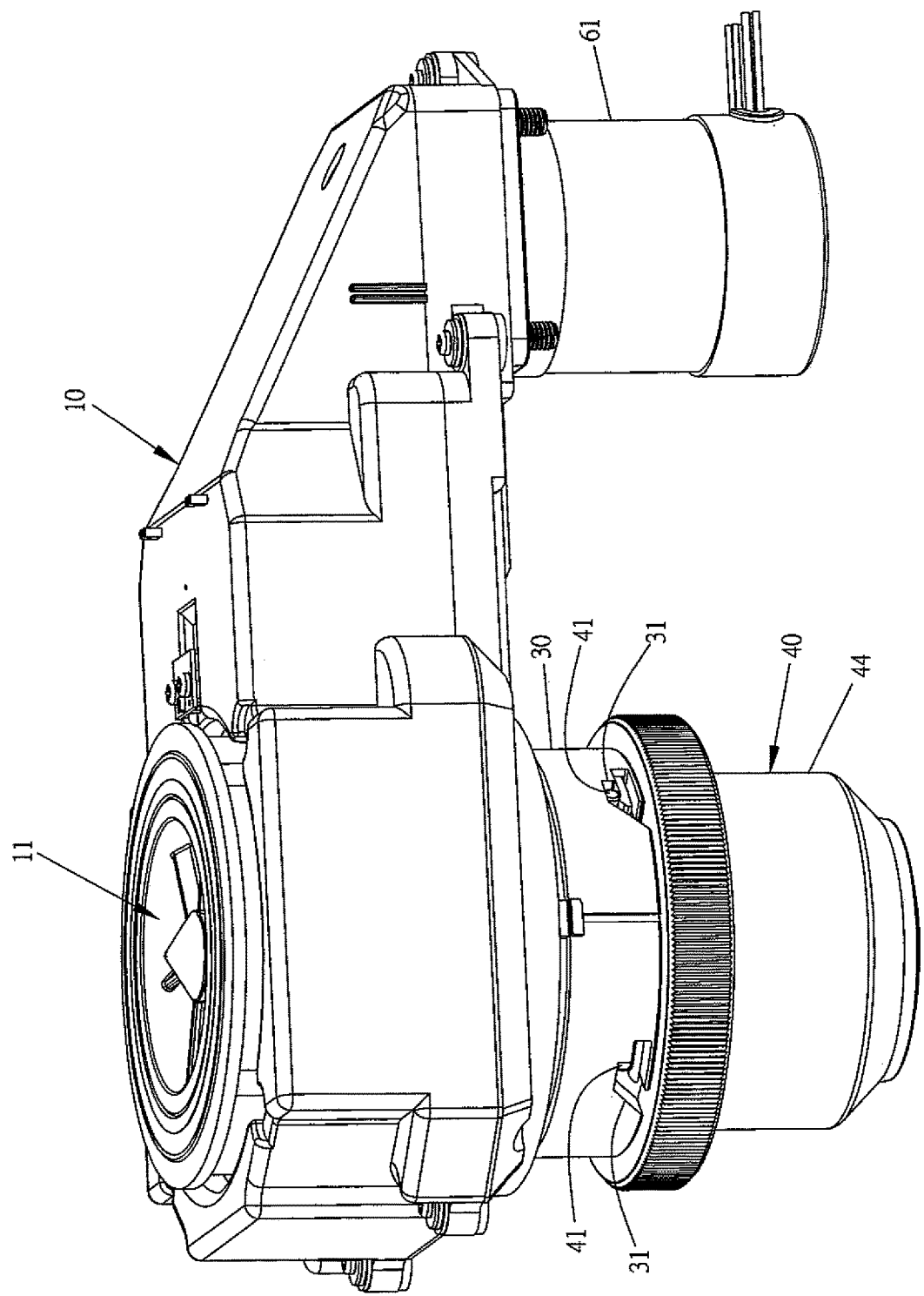
FIG. 6 is an assembly schematic view showing the installing unit and grinding base of the present invention.

A grinding base 40 is installed with a grinding head 50 at an upper end thereof. The grinding head 50 is positioned within the grinding disk 20, as shown in FIGS. 6 and 7. The grinding base 40 is installed with at least one linking unit 41 for linking the installing unit 30. The at least one linking unit 41 is separably attached to the box body 10. The grinding base 40 and the grinding head 50 do not rotate. With reference to FIGS. 2, 5 and 7, an outer side of the grinding head 50 and an inner side of the grinding disk are installed with grinding teeth 25. A gap 13 is formed between the grinding teeth 25 of the grinding head 50 and the grinding teeth 25 of the grinding disk 20. An upper side of the gap 13 is connected to the inlet 11.

A driving device 60 is connected to the grinding disk 20 for driving the grinding disk 20 to rotate. When the grinding disk 20 rotates, the grinding teeth 25 of the grinding disk 20 rotates around the grinding teeth 25 of the grinding head 50 so that the objects to be ground fall into the gap 13 from the inlet 11 and are ground as particles, then being outputted from a lower side of the gap 13.

In the present invention, the installing unit 30 has a circular structure and the grinding base 40 penetrates through the installing unit 30.

As illustrated in FIGS. 6 to 8, the linking unit 41 is buckled to the installing unit 30. The installing unit 30 is formed with a plurality of recesses 31 which are circularly arranged at a lower side of the installing unit 30. The linking unit 41 is at least one rod bodies 42 at an outer wall of the grinding base 40, in this embodiment, there are a plurality of rod bodies 42. Each rod body 42 is buckled into a respective one of the recesses 31. A lower side of each recess 31 is formed with a recess opening 32 and an interior of the recess 31 is formed with a buckle 33. In installation, the rod body 42 enters into the recess 31 from the recess opening 32 and then is buckled with the buckle 33 so that the grinding base is installed to the installing unit 30.

By above mentioned structure, a user only needs to detach the installing unit 30 from the grinding base 40, then the grinding base 40 with the grinding head 50 can be detached from the box body 10 rapidly. Therefore, the interior of the grinding disk 20 and the grinding base 40 can be cleansed, or different grinding head 50 is replaced. In the present invention, the grinding operation is performed by rotating the grinding disk while the grinding head 50 is motionless. It is only needed to position the grinding disk 20 in the box body 10 precisely and the respective position between the grinding disk 20 and the grinding head 50 are adjusted properly, then the precise vertical positioning of the two can be achieved so that the objects to be ground can be ground uniformly.

An inner diameter of the gap 13 is reduced gradually from upper end to lower end so that the objects to be ground are ground into large particles in the upper side of the gap and then are ground as fine particles at a lower side of the gap.

Figure 11:
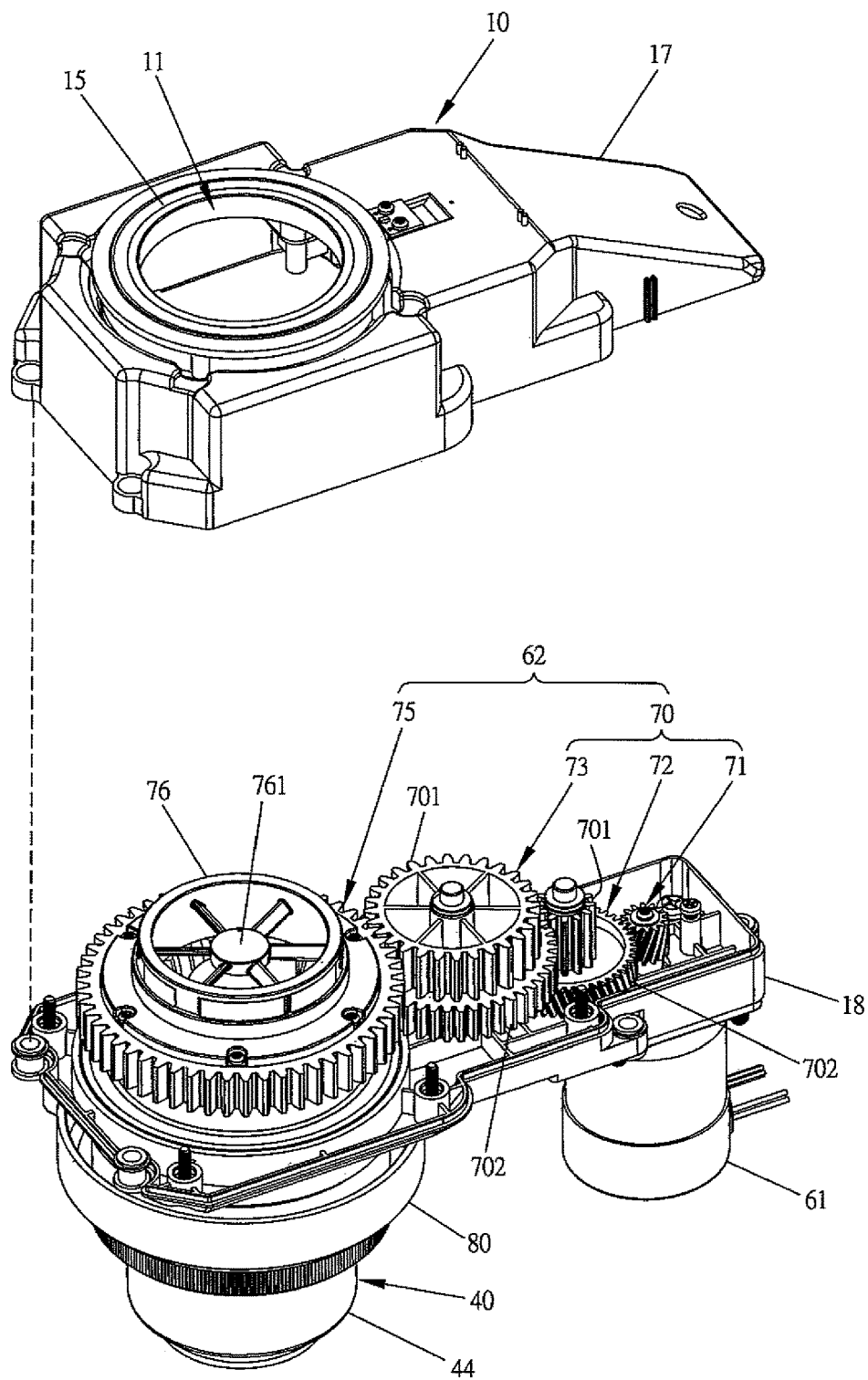
FIG. 11 is an exploded schematic view of the upper box and lower box of the present invention.
Figure 12:
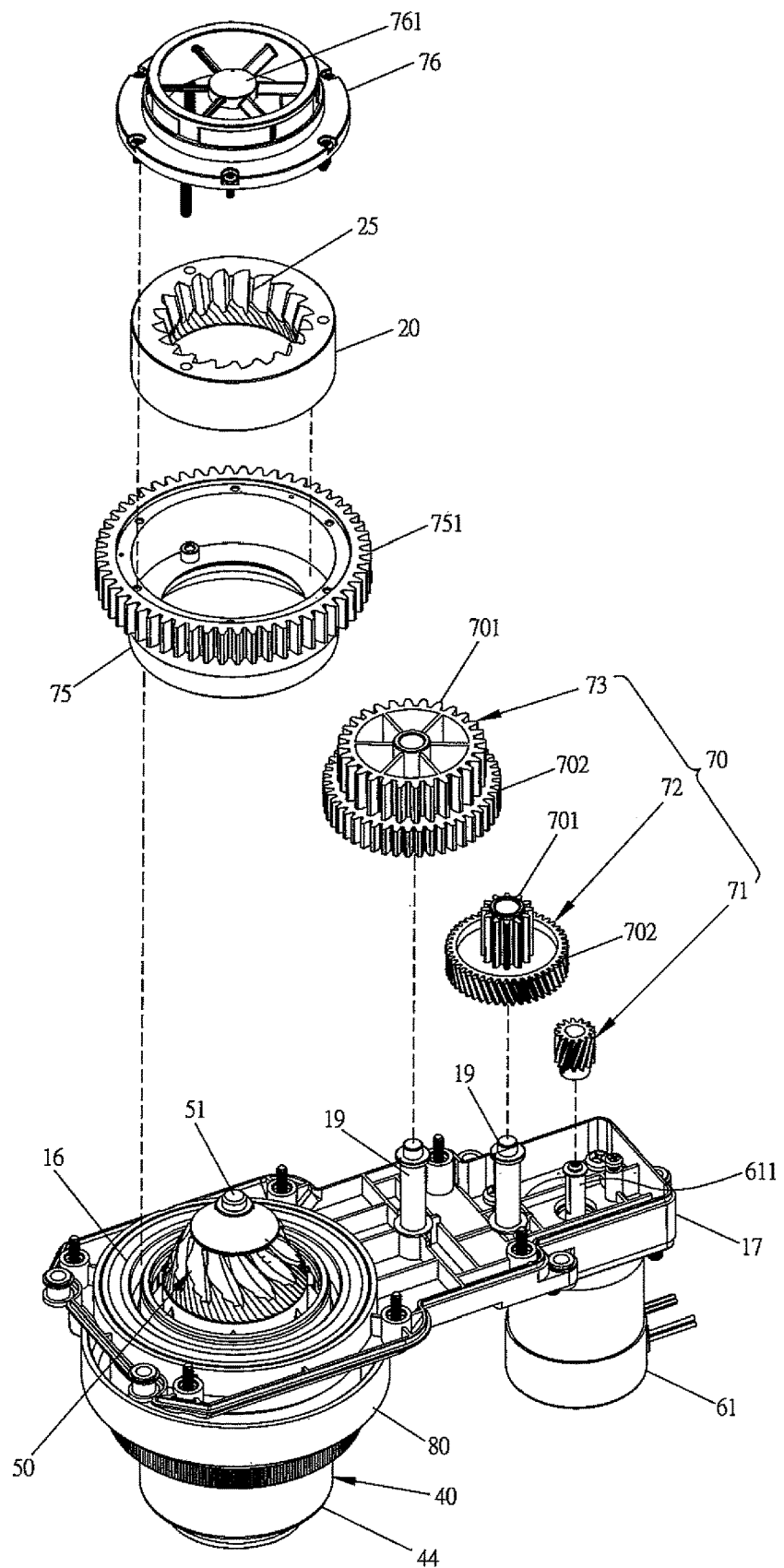
FIG. 12 is an exploded schematic view of the box body and driving device of the present invention.

With reference to FIGS. 5, 11 and 12, the driving device 60 includes a motor 61 and a speed reduction unit 62. The spindle 611 of the motor 61 is connected to the speed reduction unit 61. The speed reduction unit 61 includes a driving gear set 70 and a hollow circular gear 75. The grinding disk 20 is fixed within the circular gear 75 and an outer side of the circular gear 75 has circular outer gear 751 for engaging with the driving gear set 70. The driving gear set 70 is driven by the motor 61. The rotation speed and the torque of the motor 61 are converted by the driving gear set 70 and the circular gear 75 to have desired rotation speed and torque for driving the grinding disk 20 to rotate. The circular gear 75 and the driving gear set 70 are installed within box body 10. The motor 61 is installed at a back lower side of the box body 10.

The driving gear set 70 includes a first gear 71, a second gear 72 and a third gear 73. The second gear 72 and third gear 73 are installed to the two gear shafts 19 within the box body 10. The second gear 72 and the third gear 73 all include upper gears 701 and lower gears 72. Outer diameters of the upper gears 701 are smaller than those of the lower gears 702. The spindle 611 of the motor 61 is engaged to the first gear 71. The first gear 71 is engaged with lower gear 702 of the second gear 72. The upper gear 701 of the second gear 72 is engaged to the lower gear 702 of the third gear 73. The upper gear 701 of the third gear 73 is engaged with the outer gear 751 of the circular gear 75.

An upper bearing 15 is installed at the inlet 11 of the box body 10. Interior of the lower opening 12 of the box body 10 is installed with a lower bearing 16. An upper side of the circular gear 75 is installed with a circular frame 76. The circular frame 76 is installed within the upper bearing 15. A lower end of the circular gear 75 is installed with the lower bearing 15. The upper bearing 15 and the lower bearing 16 cause the circular gear 75 and the grinding disk 20 to be positioned steadily. The circular gear 75 has an effect of smooth rotation so that the grinding disk 20 rotates therein steadily.

A center of the circular gear 75 is installed with a central bearing 761 and an upper end of the grinding base 40 is installed with linking shaft 51. The linking shaft 51 extended upwards to penetrate through the grinding head 50. An upper end of the linking shaft 51 is inserted into the central bearing 761.

Figure 13:
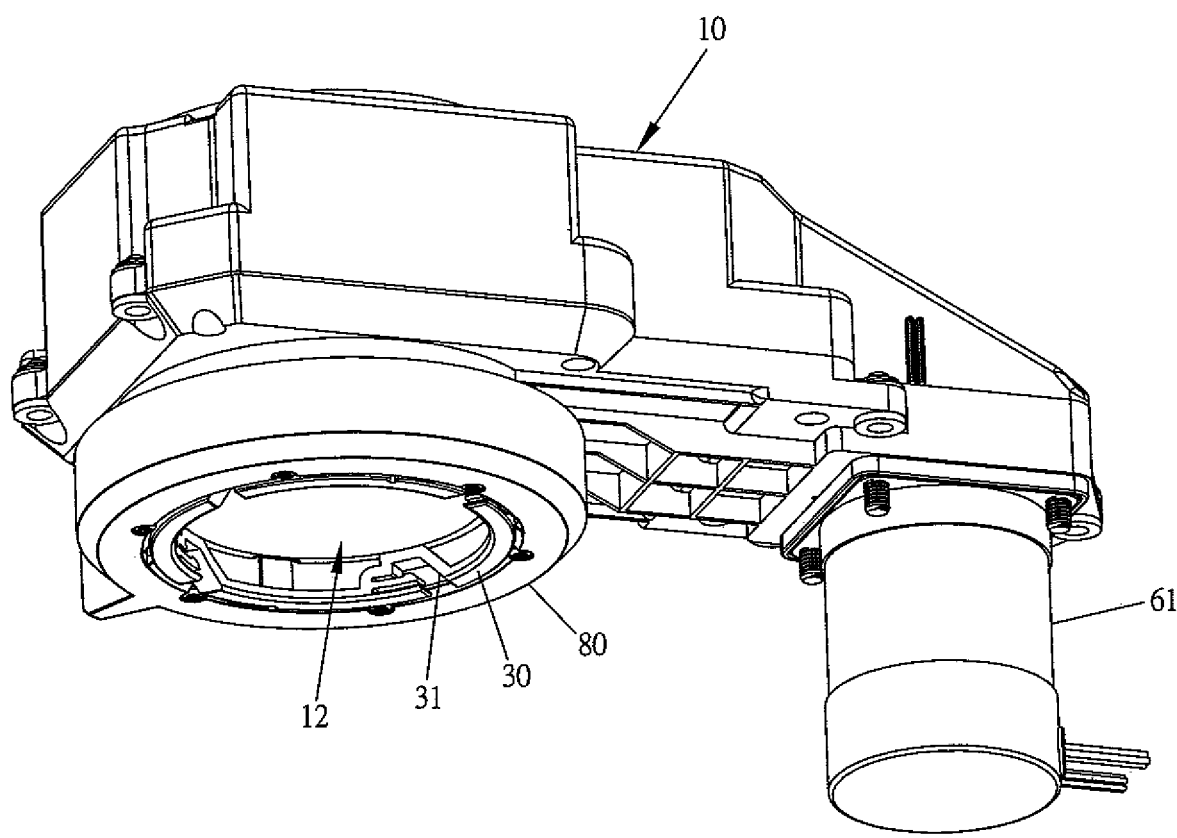
FIG. 13 is an assembly schematic view of the box body, installing unit and adjusting ring of the present invention.
Figure 14:
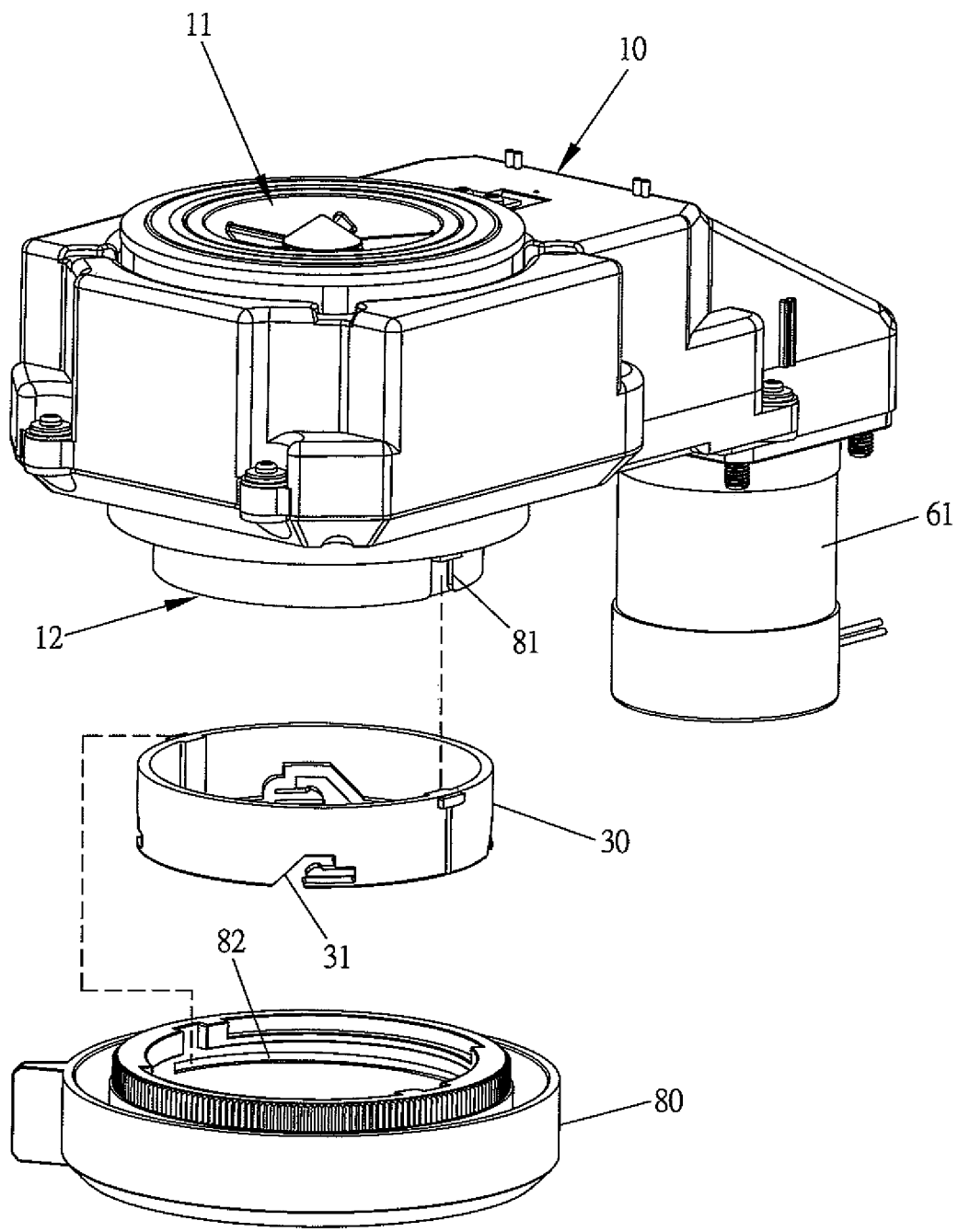
FIG. 14 is an exploded schematic view of the box body, installing unit and adjusting ring of the present invention.
Figure 15:
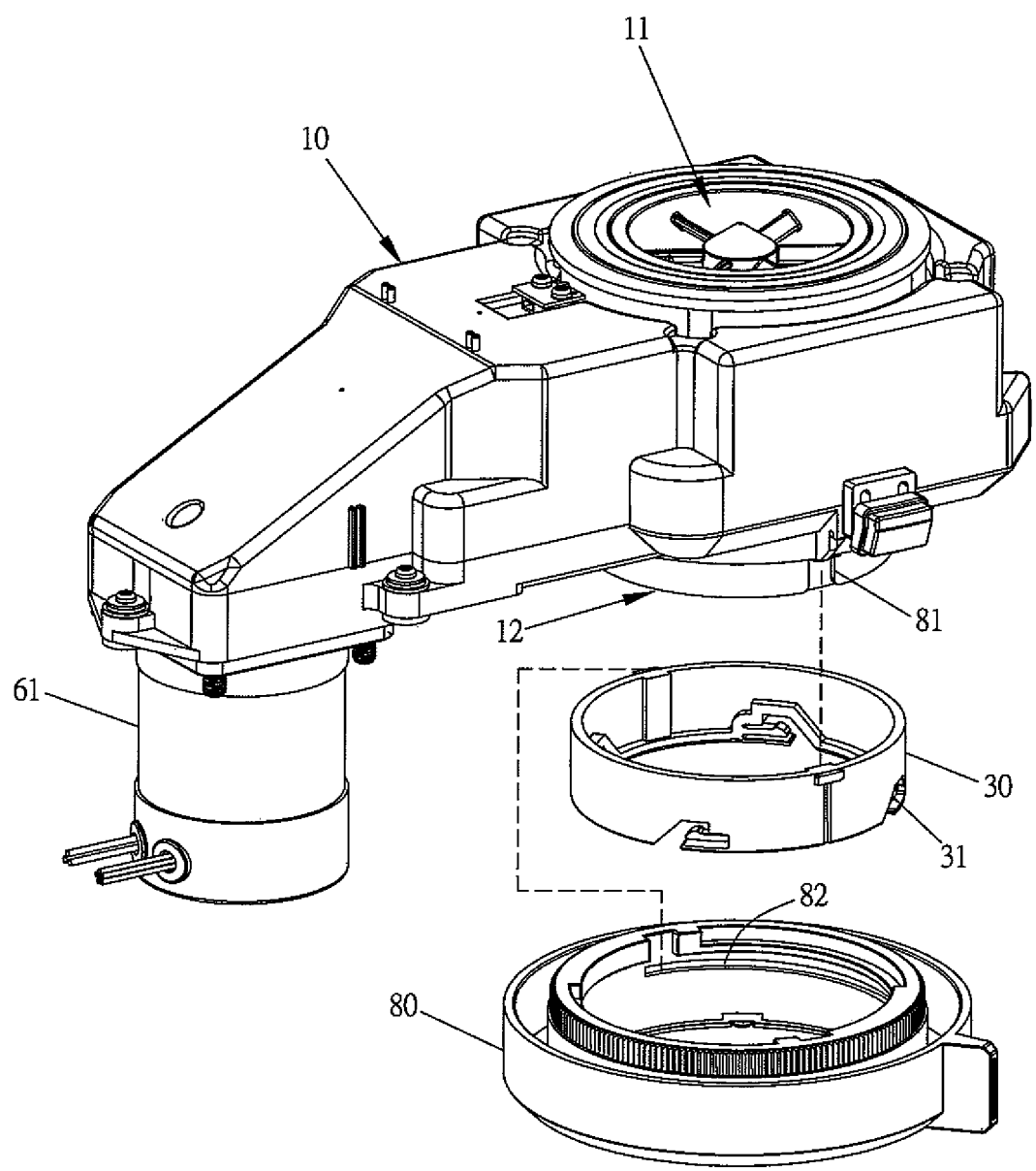
FIG. 15 is a schematic view showing another view side of FIG. 14.

With reference to FIGS. 13 to 15, the present invention further includes an adjusting ring 80 which is rotatable and is arranged around the outer side of the installing unit 30. A periphery of the lower opening 12 of the box body 10 is formed with longitudinal trenches 81. The installing unit 30 is embedded into the longitudinal trenches 81 and is movable upwards or downwards. An inner side of the adjusting ring 80 is formed with a track 82 for engaging with an outer side of the installing unit 30. The track 82 *circulars* around an inner wall of the adjusting ring 80 with specific upward slopes. When the adjusting ring 80 rotates, the track 82 will drive the installing unit 30 to move up or down along the longitudinal trenches 81 so as to drive the grinding base 40 and the grinding head 50 to vertically move for adjusting a size of the gap 13 between the grinding head 50 and the grinding disk 20. As a whole, the sizes of the particles of the objects to be ground are adjusted.

The box body 10 is divided with an upper box 16 and a lower box 18 at a lower side of the upper box 16. The inlet 11 is formed at a frond upper end of the upper box 17 and the lower opening 12 is at a front lower end of the lower box 18.

The grinding head 50 may have different forms. In this example, the grinding head 50 has a tapered shape.

Referring to FIGS. 9 to 10, an interior of the grinding base 40 is a hollow structure. A lower periphery of the grinding head 50 is formed with a circular through hole 52 which is communicated with a lower end of the gap 13. The ground particles fall into the interior of the grinding base from the circular through hole 52 to be collected by the grinding base 40. The grinding base 40 has an approximate cylinder structure with an inner lower side thereof being formed with a bottom opening 43. The bottom opening 43 is sealed by an openable cover 44. The user can open the cover 44 for cleaning the interior of the grinding base 40. Preferable, the cover 44 is magnetically combined with the bottom opening 43.

Figure 3:
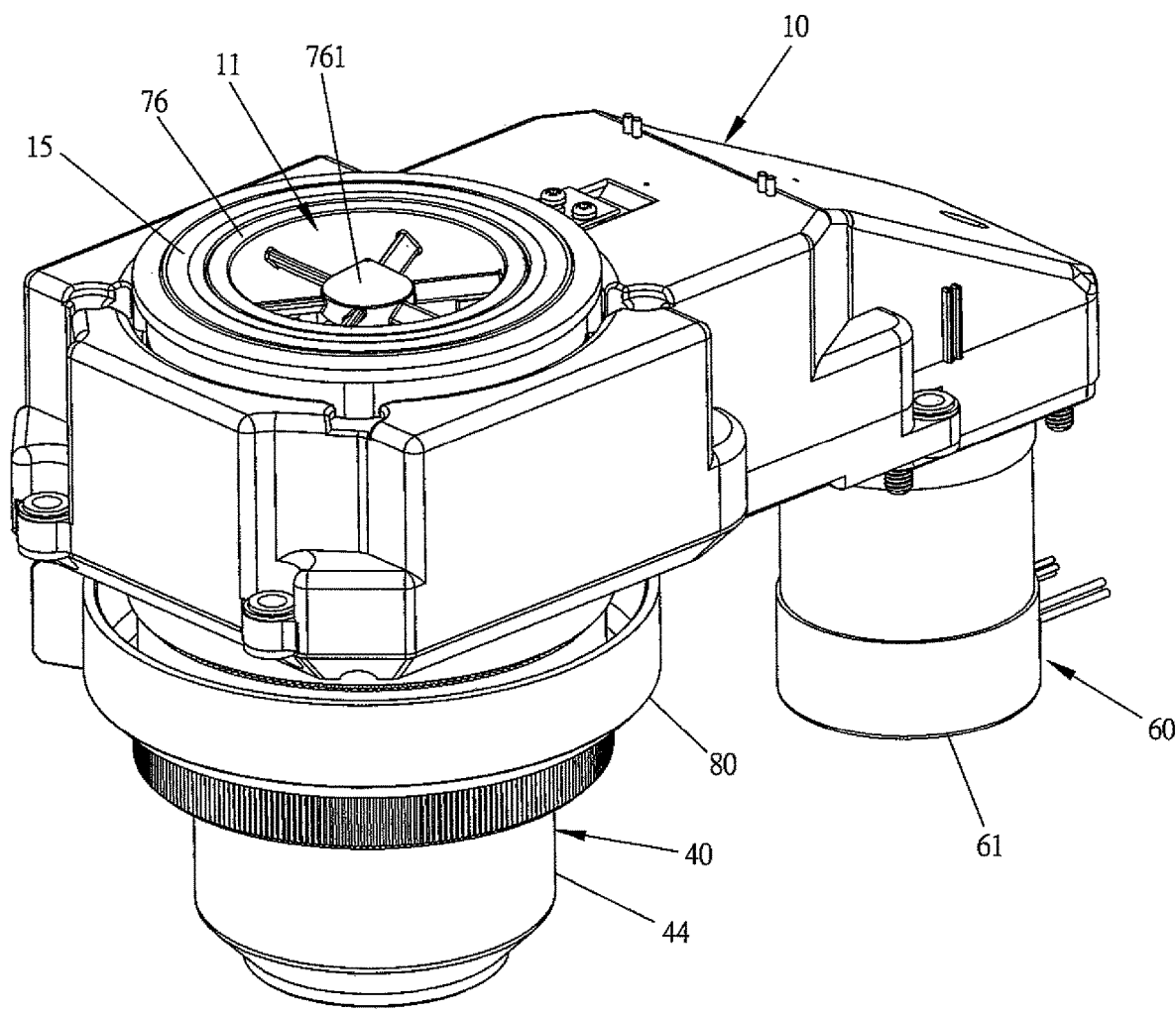
FIG. 3 is an assembly schematic view showing the assembly of the box body, the installing unit, the adjusting ring and the grinding base.

With reference to FIG. 3, a front upper end of the casing 1 has a receiving groove 5 for installing the cover 4 for receiving the objects to be ground. An upper side of the inlet 11 of the box body 10 is communicated with the receiving groove 5. The lower opening 12 of the box body 10 exposes out of a lower through hole 3 at a front lower of the casing 1. The casing 1 is divided into an upper casing body 6 and a lower casing body 7. The driving device 60 is installed within the casing 1. A bottom of the casing 1 is installed with a seat 8.

Advantages of the present invention are that: the grinding head is detachable from the box body of the grinding disk so that a user can detach the whole grinding head rapidly. It can be cleaned rapidly and another grinding head can be updated. The rapid detachable structure of the present invention has a simple structure with a lower producing cost. Furthermore in the present invention, only the grinding disk is rotatable, while the grinding head does not rotate. The motor and the speed reduction unit are used to drive the grinding disk so as to have greater torque. Two bearings are used to steady the grinding disk as it rotates. As a result, the center of the grinding head and the grinding disk is retained with a precise vertical positioning so that the objects can be ground uniformly.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A bean grinding machine with a quick detachable grinding base, comprising:
    a casing;
    a box body installed within the casing; an upper side the box body having an inlet for receiving external objects to be ground; a lower side of the box body having a lower opening;
    a grinding disk installed within the box body and between the inlet and the lower opening of the box body; the grinding disk being a circular structure with a hollow center portion;
    an installing unit installed at & the lower opening of the box body; and
    a grinding base installed with a grinding head at an upper end thereof; the grinding head being positioned within the grinding disk; the grinding base being installed with at least one linking unit for linking the installing unit; the at least one linking unit being separably attached to the box body; the grinding base and the grinding head do not rotate; an outer side of the grinding head and an inner side of the grinding disk being installed with grinding teeth; a gap being formed between the grinding teeth of the grinding head and the grinding teeth of the grinding disk; and an upper side of the gap is connected to the inlet;
    wherein a driving device is connected to the grinding disk for driving the grinding disk to rotate; when the grinding disk rotates, the grinding teeth of the grinding disk rotates around the grinding teeth of the grinding head so that the objects to be ground fall into the gap from the inlet and are ground as particles, then being outputted from a lower side of the gap;
    wherein the driving device includes a motor and a speed reduction unit; a spindle of the motor is connected to the speed reduction unit; the speed reduction unit includes a driving gear set and a hollow circular gear; the grinding disk is fixed within the circular gear and an outer side of the circular gear has circular outer gear for engaging with the driving gear set; the driving gear set is driven by the motor; the rotation speed and the torque of the motor are converted by the driving gear set and the circular gear to have desired rotation speed and torque for driving the grinding disk to rotate; and
    wherein an upper bearing is installed at the inlet of the box body; interior of the lower opening of the box body is installed with a lower bearing; an upper side of the circular gear is installed with a circular frame; the circular frame is installed within the upper bearing; a lower end of the circular gear is installed with the lower bearing; the upper bearing and the lower bearing cause the circular gear and the grinding disk to be positioned steadily; the circular gear has an effect of smooth rotation so that the grinding disk rotates therein steadily.

2. The bean grinding machine with the quick detachable grinding base as claimed in claim 1, wherein the linking unit is buckled to the installing unit.

3. The bean grinding machine with the quick detachable grinding base as claimed in claim 2, wherein the installing unit has a circular structure and the grinding base penetrates through the installing unit; the installing unit is formed with a plurality of recesses which are circularly arranged at a lower side of the installing unit; the linking unit is at least one rod bodies at an outer wall of the grinding base, and each rod body is buckled into a respective one of the recesses.

4. The bean grinding machine with the quick detachable grinding base as claimed in claim 3, wherein a lower side of each recess is formed with a recess opening and an interior of the recess is formed with a buckle; in installation, the rod body enters into the recess from the recess opening and then is buckled with the buckle so that the grinding base is installed to the installing unit.

5. The bean grinding machine with the quick detachable grinding base as claimed in claim 1, wherein the driving gear set is installed within the box body; the driving gear set includes a first gear, a second gear and a third gear; the second gear and third gear are installed to the two gear shafts within the box body; the second gear and the third gear all include upper gears and lower gears; outer diameters of the upper gears are smaller than those of the lower gears; the spindle of the motor is engaged to the first gear; the first gear is engaged with lower gear of the second gear; the upper gear of the second gear is engaged to the lower gear of the third gear; the upper gear of the third gear is engaged with the outer gear of the circular gear.

6. The bean grinding machine with the quick detachable grinding base as claimed in claim 1, wherein a center of the circular gear is installed with a central bearing and an upper end of the grinding base is installed with linking shaft; the linking shaft extended upwards to penetrate through the grinding head; an upper end of the linking shaft is inserted into the central bearing.

7. The bean grinding machine with the quick detachable grinding base as claimed in claim 1, further comprising an adjusting ring which is rotatable and is arranged around the outer side of the installing unit; a periphery of the lower opening of the box body is formed with longitudinal trenches; the installing unit is embedded into the longitudinal trenches and is movable upwards or downwards; an inner side of the adjusting ring is formed with a track for engaging with an outer side of the installing unit; the track *circulars* around an inner wall of the adjusting ring with specific upward slopes; when the adjusting ring rotates, the track will drive the installing unit to move up or down along the longitudinal trenches so as to drive the grinding base and the grinding head to vertically move.

8. The bean grinding machine with the quick detachable grinding base as claimed in claim 1, wherein an interior of the grinding base is a hollow structure; a lower periphery of the grinding head is formed with a circular through hole which is communicated with a lower end of the gap; the ground particles fall into the interior of the grinding base from the circular through hole to be collected by the grinding base.

9. The bean grinding machine with the quick detachable grinding base as claimed in claim 8, wherein the grinding base has an approximate cylinder structure with an inner lower side thereof being formed with a bottom opening, and the bottom opening is sealed by an openable cover.

10. The bean grinding machine with the quick detachable grinding base as claimed in claim 9, wherein the cover is magnetically combined with the bottom opening.

* * * * *